United States Patent
Moriwaki et al.

(10) Patent No.: US 6,518,969 B2
(45) Date of Patent: Feb. 11, 2003

(54) THREE DIMENSIONAL GRAPHICS DRAWING APPARATUS FOR DRAWING POLYGONS BY ADDING AN OFFSET VALUE TO VERTEX DATA AND METHOD THEREOF

(75) Inventors: Shohei Moriwaki, Hyogo (JP); Yoshifumi Azekawa, Hyogo (JP); Osamu Chiba, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 211 days.

(21) Appl. No.: 09/768,355

(22) Filed: Jan. 25, 2001

(65) Prior Publication Data

US 2001/0026275 A1 Oct. 4, 2001

(30) Foreign Application Priority Data

Mar. 31, 2000 (JP) ........................................ 2000-098615

(51) Int. Cl.$^7$ .............................................. G06T 17/00
(52) U.S. Cl. ...................................... 345/473; 345/418
(58) Field of Search ................................ 345/472, 473, 345/474, 418

(56) References Cited

U.S. PATENT DOCUMENTS 5,748,169 A * 5/1998 Okumura et al. ............ 345/100
6,064,393 A * 5/2000 Lengyel et al. ............. 345/427
6,243,856 B1 * 6/2001 Meyer et al. ................ 717/146
6,388,670 B2 * 5/2002 Naka et al. .................. 345/474
6,404,435 B1 * 6/2002 Miller et al. ................. 345/468

FOREIGN PATENT DOCUMENTS

| JP | 7-282270 | 10/1995 |
| JP | 10-188002 | 7/1998 |
| JP | 11-339072 | 12/1999 |

* cited by examiner

*Primary Examiner*—Cliff N Vo
(74) *Attorney, Agent, or Firm*—McDermott, Will & Emery

(57) ABSTRACT

A three-dimensional graphics drawing apparatus includes a geometrical operation unit generating vertex data of a polygon, an offset register storing an offset value for the vertex data of the polygon generated by the geometrical operation unit, an offset operating circuit adding the offset value stored in the offset register to the vertex data of the polygon output from the geometrical operation unit, and a drawing unit drawing the polygon based on the vertex data after the addition by the offset operating circuit. Therefore, even with a geometrical operation unit having relatively low process performance, it becomes possible to draw a primitive which changes with motion, for example, at high speed.

15 Claims, 5 Drawing Sheets

THREE DIMENSIONAL GRAPHICS DRAWING APPARATUS FOR DRAWING POLYGONS BY ADDING AN OFFSET VALUE TO VERTEX DATA AND METHOD THEREOF

BACKGROUND OF THE INVENTION

1. Field of the Invention

The present invention relates to a technique for drawing three-dimensional graphics and, more specifically, to a method and an apparatus for drawing three-dimensional graphics capable of providing drawing effects such as motion, without the necessity of repeating complicated processes including geometrical operations.

2. Description of the Background Art

Recently, in order to enable output of realistic and delicate images on a personal computer or a home use game machine, developments of three-dimensional graphics drawing apparatuses performing three-dimensional image processing at high speed have been vigorously made. In a conventional three-dimensional graphics drawing apparatus, when a drawing primitive representing an object on an image plane is to be moved, coordinates and the like of the primitive that change as the primitive moves must be calculated by geometrical operations or coordinate operation processes frame by frame.

An expensive geometrical operation unit having high geometrical operation performance have been required in the three-dimensional graphics drawing apparatus in order to calculate coordinates and the like of the primitive mentioned above at high speed. This resulted in the problem of increased cost of the three-dimensional graphics drawing apparatus.

It may be possible to move the primitive by storing vertex data (vertex coordinate data, color data, transmissivity data, texture mapping coordinate data) of a polygon subjected to geometrical operation in advance in an external memory and by drawing the vertex data frame by frame, rather than providing the expensive geometrical operation unit in the three-dimensional graphics drawing apparatus. The amount of data of the moving primitive, however, is formidable, which means that an external memory of huge storage capacity is necessary.

SUMMARY OF THE INVENTION

An object of the present invention is to provide a method and an apparatus for drawing three-dimensional graphics capable of drawing a primitive that changes as it moves at high speed, with a geometrical operation unit of relatively low process performance.

Another object of the present invention is to provide a method and an apparatus for drawing three-dimensional graphics capable of drawing, at high speed, a primitive that changes as it moves, without necessitating an external memory of a huge storage capacity, even when a geometrical operation unit is not used.

According to an aspect of the present invention, the three-dimensional graphics drawing apparatus includes a geometrical operation unit generating vertex data of a polygon, an offset register storing an offset value for the vertex data of the polygon generated by the geometrical operation unit, an offset operating circuit performing an arithmetic operation on the vertex data of the polygon output from the geometrical operation unit using the offset value stored in the offset register, and a drawing unit drawing the polygon, based on the vertex data after the arithmetic operation by the offset operating circuit.

The offset operating circuit performs an arithmetic operation on the vertex data of the polygon output from the geometrical operation unit with the offset value stored in the offset register. Therefore, by successively updating the offset value stored in the offset register, it becomes possible to represent motion or the like of the primitive. Therefore, even with a geometrical operation unit having relatively low process performance, it is possible to draw a primitive that changes as it moves, for example, at high speed.

According to another aspect of the present invention, the three-dimensional graphics drawing apparatus includes a reading unit reading vertex data of a polygon, which have been subjected to geometrical operation in advance, an offset register storing an offset value for the vertex data of the polygon read by the reading unit, an offset operating circuit performing an arithmetic operation on the vertex data of the polygon read by the reading unit using the offset value stored in the offset register, and a drawing unit drawing the polygon based on the vertex data operated by the offset operating circuit.

The offset operating circuit performs an arithmetic operation on the vertex data of the polygon, which have been subjected to geometrical operation in advance, with the offset value stored in the offset register. Therefore, it becomes possible to represent motion of the primitive, for example, by successively updating the offset value stored in the offset register. Further, as the vertex data of the polygon that have been subjected to geometrical operation in advance are used, the geometrical operation unit, which has been necessary in the conventional three-dimensional graphics drawing apparatus, becomes unnecessary.

According to a still further aspect, the method of drawing three-dimensional graphics in accordance with the present invention includes the steps of reading vertex data of a polygon that have been subjected to geometrical operation in advance, operating the read vertex data of the polygon with an offset value, and drawing the polygon based on the vertex data after the arithmetic operation with the offset value.

As the vertex data of the polygon that have been subjected to geometrical operation in advance are operated with the offset value, it becomes possible to represent motion or the like of the primitive by successively updating the offset value. Further, as the vertex data of the polygon that have been subjected to geometrical operation in advance are used, the geometrical operation unit, which have been necessary in the conventional three-dimensional graphics drawing apparatus, becomes unnecessary.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
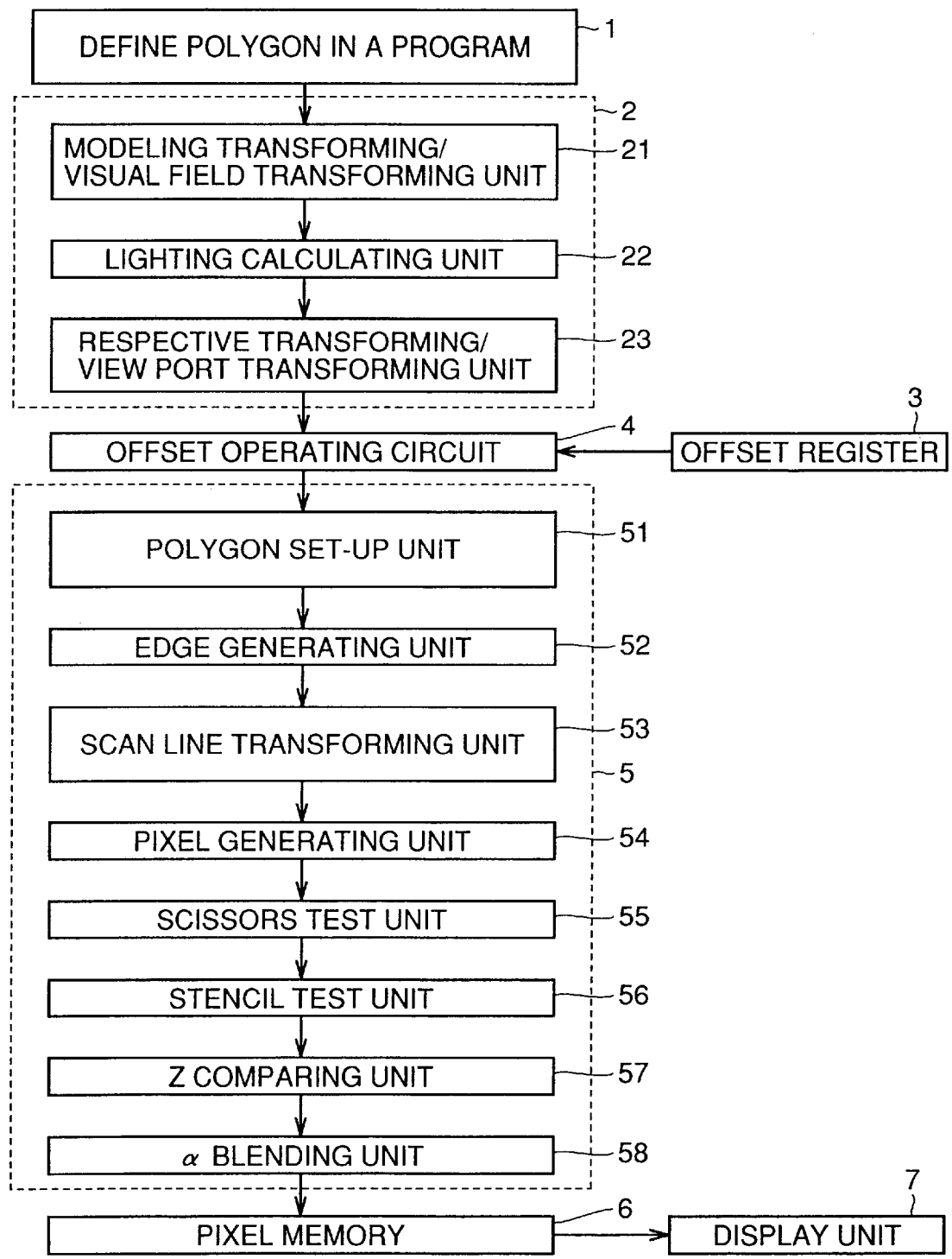
FIG. 1 is a block diagram representing a schematic configuration of a three-dimensional graphics drawing apparatus in accordance with first to fourth embodiments of the present invention.

FIG. 1 is a block diagram representing a schematic configuration of a three-dimensional graphics drawing apparatus in accordance with the first embodiment of the present invention. The three-dimensional graphics drawing apparatus includes: a geometrical operation unit 2 receiving three-dimensional drawing data 1 defined by a world coordinate system in a program, and performing a series of geometrical operations on the three-dimensional drawing data 1; an offset register 3 holding an offset value to be added to vertex data of each polygon constituting a primitive; an offset operating circuit 4 adding (subtracting) an offset value held in offset register 3 to (and from) the vertex data output from geometrical operation unit 2; a drawing unit 5 performing a series of drawing processes based on the vertex data after the arithmetic operation output from the offset operating circuit 4; a pixel memory 6 storing pixel data generated by the drawing unit 5, as a frame image; and a display unit 7 displaying the pixel data stored in pixel memory 6.

A microprocessor, not shown, executes a program, and when three-dimensional drawing data (polygon definition) 1 is described in the program, the three-dimensional drawing data 1 is output to geometrical operation unit 2. The geometrical operation unit 2 performs a geometrical operation on the three-dimensional drawing data 1, and provides, onto a view port, vertex data of each polygon constituting a coordinate-transformed primitive, for example, vertex coordinate data. Offset operating circuit 4 adds, when the vertex coordinate data (X, Y, Z) generated by the geometrical operation unit 2 is input, an offset value stored in offset register 3 to the vertex coordinate data and outputs the result.

Drawing unit 5 generates pixel data of each polygon constituting the primitive based on the vertex coordinate data after the addition of the offset value output from offset operating circuit 4, and writes the generated pixel data to pixel memory 6. Display unit 7 reads pixel data from pixel memory 6 at a time when pixel data corresponding to one frame are written by drawing unit 5, and successively displays, so that the motion of the primitive can be represented with close resemblance.

The geometrical operation unit 2 includes: a modeling transforming/visual field transforming unit 21 defining a three-dimensional shape to be drawn in a modeling coordinate system, transforming the three-dimensional shape defined in the modeling coordinate system to the world coordinate system so that the shape is arranged in a space, determining projection conditions including a position of a view point and a direction of a visual line for the three-dimensional shape, and for transforming to a three-dimensional shape in a viewing area; a lighting calculating unit 22 calculating lighting of illumination of the three-dimensional shape after modeling transformation/visual field transformation by the modeling transforming/visual field transforming unit 21; and a perspective transforming/view port transforming unit 23 for perspective transformation of the object three-dimensional shape and transforming the visual area to a view port.

Drawing unit 5 includes: a polygon set-up unit 51 calculating difference between vertex coordinates of a polygon to output an inclination between vertexes of the polygon; an edge generating unit 52 generating an edge between the vertexes of the polygon, with reference to the inclination between the vertexes of the polygon output from polygon set-up unit 51; a scan line transforming unit 53 transforming each polygon pixel by pixel, based on the edge of the polygon generated by edge generating unit 52; a pixel generating unit 54 generating pixel data in each polygon; a scissors test unit 55 deleting pixels not falling within a display frame; a stencil test unit 56 determining whether each pixel is an object of drawing or not; a Z comparing unit 57 comparing Z values of the polygon to determine whether the polygon is to be drawn on the display image plane; and a blending unit 58 synthesizing color data of succeeding polygons with reference to an α value representing degree of transparency.

Figure 2A:
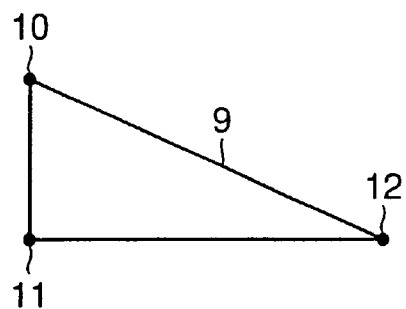
FIGS. 2A to 2D are illustrations representing processing of a primitive by the three-dimensional graphics drawing apparatus in accordance with the first and fifth embodiments of the present invention.
Figure 2B:
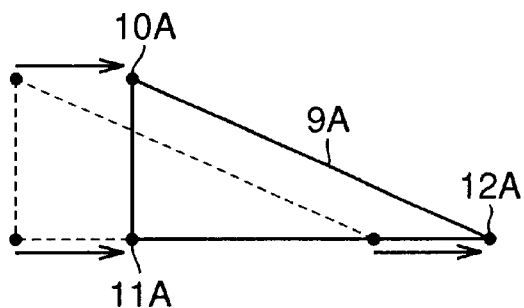

FIGS. 2A to 2D are illustrations representing processing of a primitive by the three-dimensional graphics drawing apparatus in accordance with the present embodiment. FIG. 2A shows a polygon 9 constituting a primitive before processing, which is drawn by three vertex coordinates 10 to 12. When an offset value is added to the X coordinate of the vertex coordinate data of polygon 9 shown in FIG. 2A, then the vertex coordinates 10 to 12 move to new vertex coordinates 10A to 12A as shown in FIG. 2B, and polygon 9 is translated along the X axis and drawn as a polygon 9A.

Figure 2C:
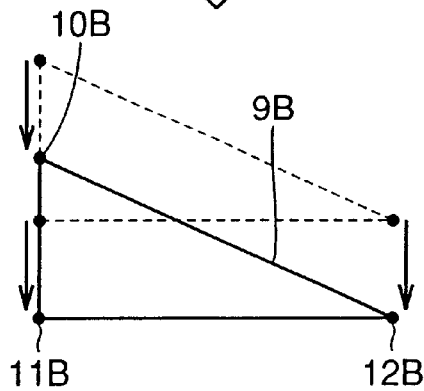
Figure 2D:
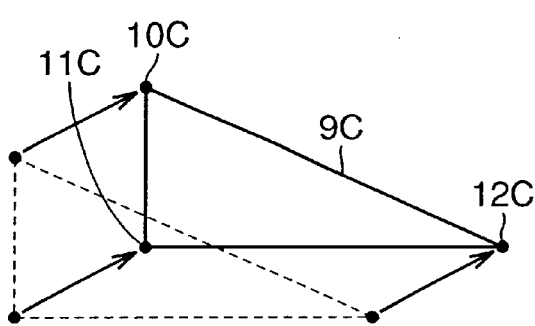

When the offset value is added to Y coordinates of the vertex coordinate data of polygon 9 shown in FIG. 2A, vertex coordinates 10 to 12 move respectively to new vertex coordinates 10B to 12B as shown in FIG. 2C, and polygon 9 is translated along the Y axis and drawn as polygon 9B. When the offset value is added to the Z coordinates of the vertex coordinates of polygon 9 shown in FIG. 2A, vertex coordinates 10 to 12 respectively move to new vertex coordinates 10C to 12C as shown in FIG. 2D, and polygon 9 is translated along the Z axis and drawn as polygon 9C.

In this manner, by successively updating the offset value stored in offset register 3, it becomes possible to represent motion of the primitive by shifting the vertex coordinate data of only such a primitive that has motion.

As described above, according to the three-dimensional graphics drawing apparatus in accordance with the present embodiment, an offset value is added to vertex coordinates of a polygon constituting a primitive calculated by geometrical operation unit 2 and the result is output to drawing unit 5, so that the motion of the primitive is represented with close resemblance. Therefore, different from the conventional three-dimensional graphics drawing apparatus, it is unnecessary to repeat geometrical operations on a moving primitive, so that high speed drawing becomes possible, and hence, the speed of processing of the overall three-dimensional graphics drawing apparatus can be improved.

Further, as the speed of processing of the overall three-dimensional graphics drawing apparatus increases, the geometrical operation unit allowing high speed geometrical operation becomes unnecessary, allowing use of an inexpensive geometrical operation unit with relatively low operation processing performance.

Second Embodiment

The three-dimensional graphics drawing apparatus in accordance with the second embodiment of the present invention is similar in schematic configuration to the three-dimensional graphics drawing apparatus in accordance with the first embodiment shown in FIG. 1, and differs only in that the object of operation by the offset operating circuit is the color data (R, G, B). Therefore, detailed description of the configuration and functions will not be repeated. In the present embodiment, the offset register and the offset operating circuit will be denoted by the reference characters 3a and 4a.

Figure 3A:
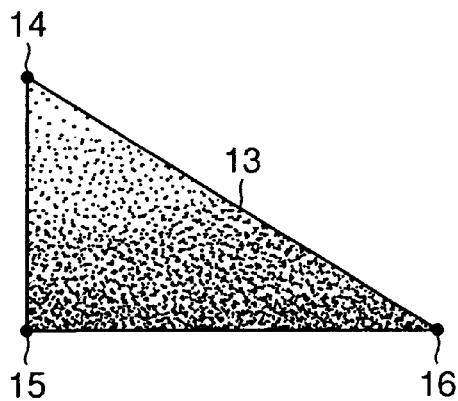
FIGS. 3A and 3B are illustrations representing processing of a primitive by the three-dimensional graphics drawing apparatus in accordance with the second and sixth embodiments of the present invention.
Figure 3B:
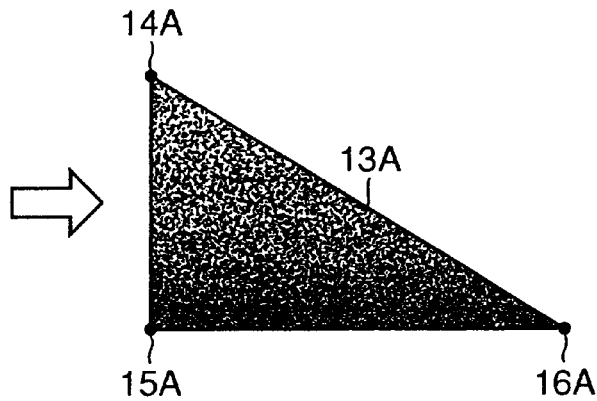

FIGS. 3A and 3B represent processing of the primitive by the three-dimensional graphics drawing apparatus in accordance with the present embodiment. FIG. 3A represents a polygon 13 constituting a primitive before processing, which is drawn by three vertex color data 14 to 16. For example, when offset operating circuit 4a adds an offset value stored in offset register 3a to color data 14 to 16 of the vertexes of polygon 13, the color data 14 to 16 of respective vertexes are changed to new color data 14A to 16A as shown in FIG. 3B. As a result, it becomes possible for drawing unit 5 to paint the polygon 13A in different gradation.

In this manner, by successively updating the offset value stored in offset register 3a, it becomes possible to make the overall color of the primitive darker or lighter, and the drawing effect of white-out or black-out can easily be attained. Further, by adding an offset value only to any of R, G and B, it becomes possible to draw the same primitive in a color completely different from the original color.

As described above, according to the three-dimensional graphics drawing apparatus in accordance with the present embodiment, by adding an offset value to color data of vertexes of a polygon constituting a primitive calculated by geometrical operation unit 2 and outputting the result to drawing unit 5, the change in color is represented. Therefore, different from the conventional three-dimensional graphics drawing apparatus, it becomes unnecessary to repeat geometrical operations on the primitive, high speed drawing becomes possible, and hence the speed of processing of the overall three-dimensional graphics drawing apparatus can be improved.

Further, as the speed of processing of the overall three-dimensional graphics drawing apparatus increases, the geometrical operation unit allowing high speed geometrical operation becomes unnecessary, allowing use of an inexpensive geometrical operation unit with relatively low operation processing performance.

Third Embodiment

The three-dimensional graphics drawing apparatus in accordance with the third embodiment of the present invention is similar in schematic configuration to the three-dimensional graphics drawing apparatus in accordance with the first embodiment shown in FIG. 1, and differs only in that the object of operation by the offset operating circuit is the transmissivity data (A). Therefore, detailed description of the configuration and functions will not be repeated. In the present embodiment, the offset register and the offset operating circuit will be denoted by the reference characters 3b and 4b.

Figure 4A:
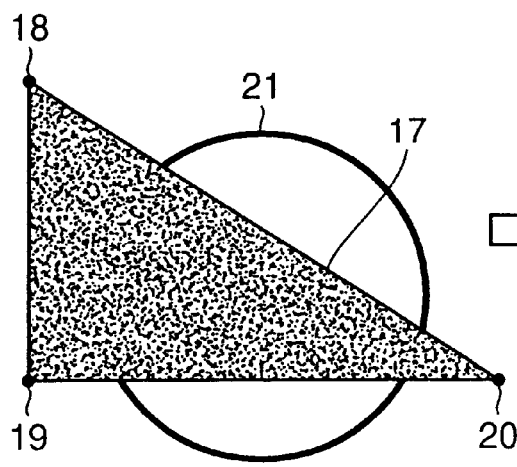
FIGS. 4A and 4B are illustrations representing processing of a primitive by the three-dimensional graphics drawing apparatus in accordance with the third and seventh embodiments of the present invention.
Figure 4B:
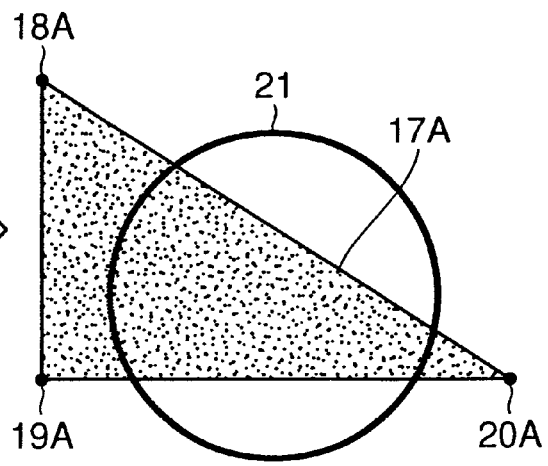

FIGS. 4A and 4B represent processing of the primitive by the three-dimensional graphics drawing apparatus in accordance with the present embodiment. FIG. 4A represents a polygon 17 constituting a primitive before processing, which is drawn by three vertex transmissivity data 18 to 20. A different primitive 21 is drawn behind polygon 17. For example, when offset operating circuit 4b adds an offset value stored in offset register 3b to transmissivity data 18 to 20 of the vertexes of polygon 17, the transmissivity data 18 to 20 of respective vertexes are changed to new transmissivity data 18a to 20a as shown in FIG. 4B. As a result, it becomes possible for drawing unit 5 to draw polygon 17A with different transmissivity, so that primitive 21 on the background can be seen through.

By successively updating the offset value stored in offset register 3b in this manner, it is possible to change transmissivity of the primitive, and therefore, it is possible to change the transmissivity of a non-transparent primitive so that another primitive on a background may be seen through.

As described above, according to the three-dimensional graphics drawing apparatus in accordance with the present embodiment, by adding an offset value to transmissivity data of vertexes of a polygon constituting a primitive calculated by geometrical operation unit 2 and outputting the result to drawing unit 5, the change in transmissivity is represented. Therefore, different from the conventional three-dimensional graphics drawing apparatus, it becomes unnecessary to repeat geometrical operations on the primitive, high speed drawing becomes possible, and hence the speed of processing of the overall three-dimensional graphics drawing apparatus can be improved.

Further, as the speed of processing of the overall three-dimensional graphics drawing apparatus increases, the geometrical operation unit allowing high speed geometrical operation becomes unnecessary, allowing use of an inexpensive geometrical operation unit with relatively low operation processing performance.

Fourth Embodiment

The three-dimensional graphics drawing apparatus in accordance with the fourth embodiment of the present invention is similar in schematic configuration to the three-dimensional graphics drawing apparatus in accordance with the first embodiment shown in FIG. 1, and differs only in that the object of operation by the offset operating circuit is the texture mapping coordinate data (U,V). Therefore, detailed description of the configuration and functions will not be repeated. In the present embodiment, the offset register and the offset operating circuit will be denoted by the reference characters 3c and 4c.

Figure 5A:
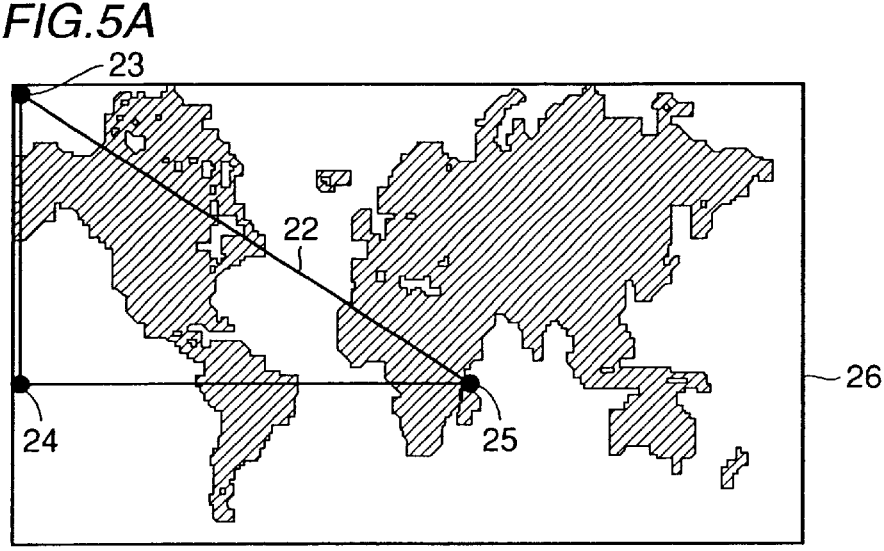
FIGS. 5A to 5C are illustrations representing processing of a primitive by the three-dimensional graphics drawing apparatus in accordance with the fourth and eighth embodiments of the present invention.
Figure 5B:
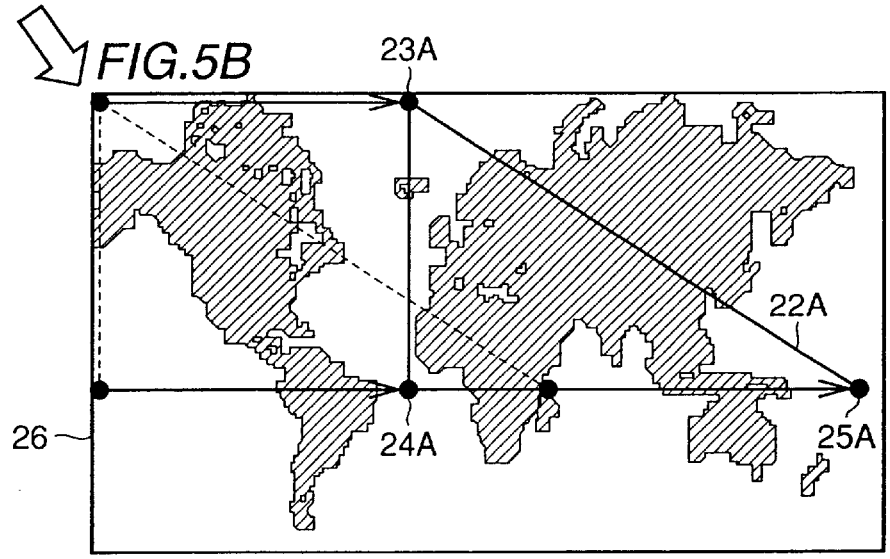
Figure 5C:
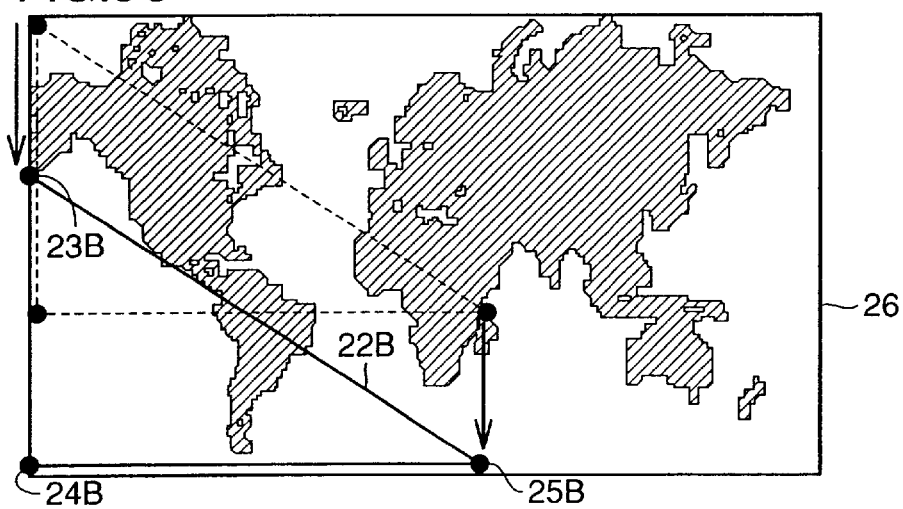

FIGS. 5A to 5C represent processing of the primitive by the three-dimensional graphics drawing apparatus in accordance with the present embodiment. FIG. 5A represents a polygon 22 constituting a primitive before processing, which is drawn by three texture mapping coordinate data 23 to 25. For example, when an offset value is added to the U value representing the X direction of the texture mapping coordinate data 23 to 25 of the polygon 22 shown in FIG. 5A, respective texture mapping coordinates 23 to 25 move to new texture mapping coordinates 23A to 25A, and the texture of polygon 22 is translated in the X direction and drawn as a texture of a polygon 22A, as shown in FIG. 5B.

When the offset value is added to V value representing the Y direction, among the texture mapping coordinate data of polygon 22 shown in FIG. 5A, respective texture mapping coordinates 23 to 25 move to new texture mapping coordinates 23B to 25B, and the texture of polygon 22 is translated in the Y direction and drawn as a texture of a polygon 22B, as shown in FIG. 5C.

By successively updating the offset value stored in offset register 3c in this manner, it is possible to shift the texture mapping coordinate data only for the texture of such a primitive that is in motion, so as to represent the motion of the texture.

As described above, according to the three-dimensional graphics drawing apparatus in accordance with the present embodiment, an offset value is added to texture mapping coordinate data of a polygon constituting a primitive calculated by geometrical operation unit 2 and the result is output to drawing unit 5, so that the motion of the texture of the primitive is represented with close resemblance. Therefore, different from the conventional three-dimensional graphics drawing apparatus, it is unnecessary to repeat geometrical operations on a moving primitive texture, so that high speed drawing becomes possible, and hence, the speed of processing of the overall three-dimensional graphics drawing apparatus can be improved.

Further, as the speed of processing of the overall three-dimensional graphics drawing apparatus increases, the geometrical operation unit allowing high speed geometrical operation becomes unnecessary, allowing use of an inexpensive geometrical operation unit with relatively low operation processing performance.

Fifth Embodiment

Figure 6:
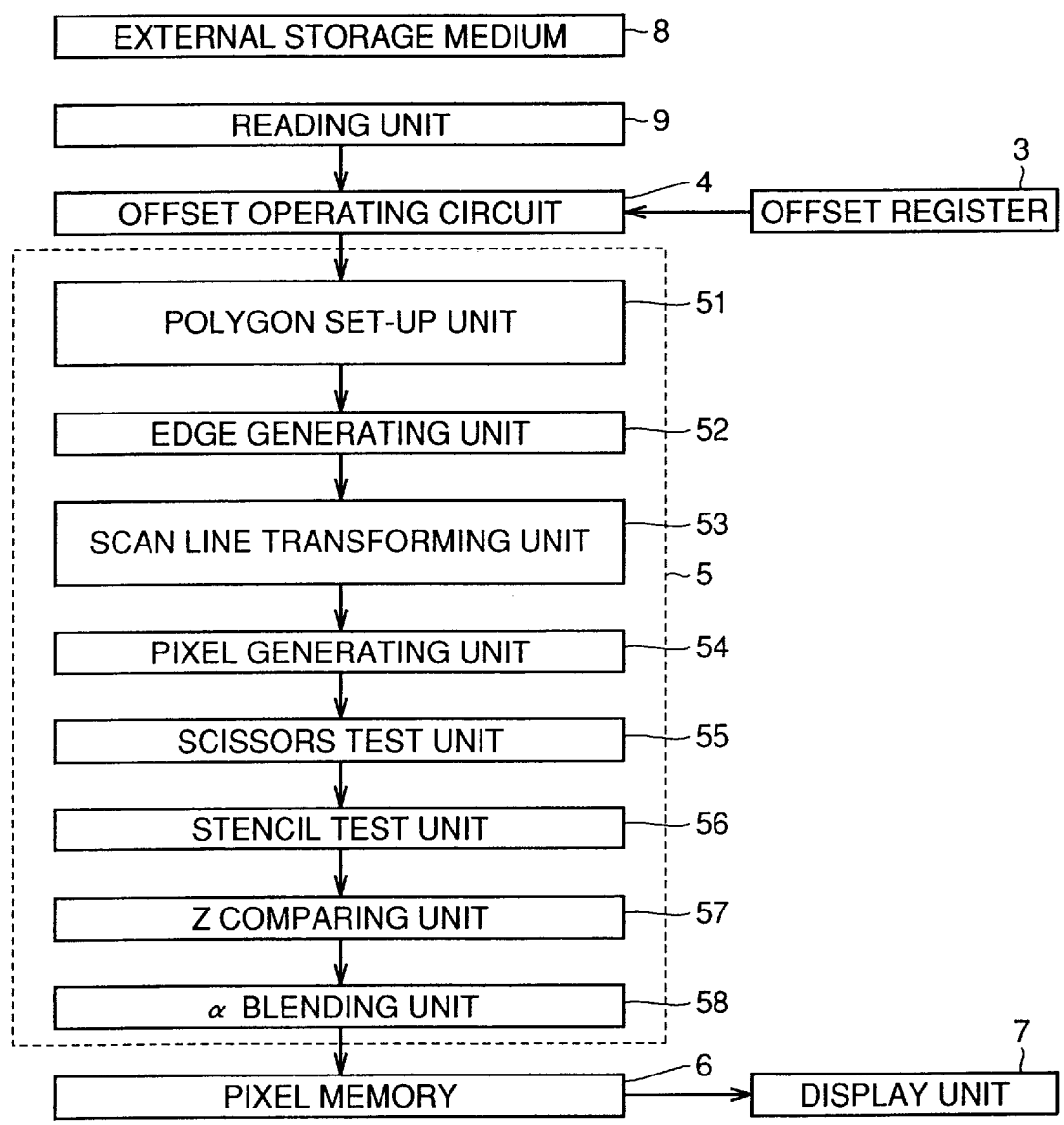
FIG. 6 is a block diagram showing a schematic configuration of the three-dimensional graphics drawing apparatus in accordance with the fifth to eighth embodiments of the present invention.

FIG. 6 is a block diagram representing a schematic configuration of the three-dimensional graphics drawing apparatus in accordance with the fifth embodiment of the present invention. The three-dimensional graphics drawing apparatus includes: a reading unit 9 successively reading vertex data of a polygon constituting a primitive recorded on an external storage medium 8; an offset register 3 holding an offset value to be added to the vertex data read by the reading unit 9; an offset operating circuit 4 adding (subtracting) the offset value held in offset register 3 to (and from) the vertex data output from a geometrical operation unit 2 and providing the result; a drawing unit 5 performing a series of drawing processes based on the vertex data after the arithmetic operation output from offset operating circuit 4; a pixel memory 6 storing pixel data generated by drawing unit 5 as a frame image; and a display unit 7 displaying the pixel data stored in pixel memory 6.

A microprocessor, not shown, reads and outputs the vertex data, for example, vertex coordinate data of the polygon constituting the primitive generated by preliminary geometrical operation from external storage medium 8 through reading unit 9. Offset operating circuit 4 adds, when the vertex coordinate data (X, Y, Z) output from the microprocessor is received, the offset value stored in the offset register 3 to the vertex coordinate data and provides the result.

Drawing unit 5 generates pixel data of each polygon constituting the primitive based on the vertex coordinate data after the addition of the offset value output from offset operating circuit 4, and writes the pixel data to pixel memory 6. Display unit 7 reads pixel data from pixel memory 6 at a time point when pixel data corresponding to one frame are written by drawing unit 5, and successively displays, so that the motion of the primitive can be represented with close resemblance.

Drawing unit 5 includes: a polygon set-up unit 51 calculating difference between vertex coordinates of a polygon to output an inclination between vertexes of the polygon; an edge generating unit 52 generating an edge between the vertexes of the polygon, with reference to the inclination between the vertexes of the polygon output from polygon set-up unit 51; a scan line transforming unit 53 transforming each polygon pixel by pixel, based on the edge of the polygon generated by edge generating unit 52; a pixel generating unit 54 generating pixel data in each polygon; a scissors test unit 55 deleting pixels not falling within a display frame; a stencil test unit 56 determining whether each pixel is an object of drawing or not; a Z comparing unit 57 comparing Z values of the polygon to determine whether the polygon is to be drawn on the display image plane; and an blending unit 58 synthesizing color data of succeeding polygons with reference to an α value representing degree of transparency.

FIGS. 2A to 2D are illustrations representing processing of a primitive by the three-dimensional graphics drawing apparatus in accordance with the present embodiment. FIG. 2A shows a polygon 9 constituting a primitive before processing, which is drawn by three vertex coordinates 10 to 12. When an offset value is added to the X coordinate of the vertex coordinate data of polygon 9 shown in FIG. 2A, then the vertex coordinates 10 to 12 move to new vertex coordinates 10A to 12A as shown in FIG. 2B, and polygon 9 is translated along the X axis and drawn as a polygon 9A.

When the offset value is added to Y coordinates of the vertex coordinate data of polygon 9 shown in FIG. 2A, vertex coordinates 10 to 12 move respectively to new vertex coordinates 10B to 12B as shown in FIG. 2C, and polygon 9 is translated along the Y axis and drawn as polygon 9B. When the offset value is added to the Z coordinates of the vertex coordinates of polygon 9 shown in FIG. 2A, vertex coordinates 10 to 12 respectively move to new vertex coordinates 10C to 12C as shown in FIG. 2D, and polygon 9 is translated along the Z axis and drawn as polygon 9C.

In this manner, by successively updating the offset value stored in offset register 3, it becomes possible to represent motion of the primitive by shifting the vertex coordinate data of only such a primitive that has motion.

As described above, according to the three-dimensional graphics drawing apparatus in accordance with the present embodiment, an offset value is added to vertex coordinates of a polygon constituting a primitive generated by previous geometrical operation and the result is output to drawing unit 5 so that the motion of the primitive is represented with close resemblance. Therefore, the geometrical operation unit, which has been necessary in the conventional three-dimensional graphics drawing apparatus, becomes unnecessary, high speed drawing becomes possible, and hence, the speed of processing of the overall three-dimensional graphics drawing apparatus can be improved.

Sixth Embodiment

The three-dimensional graphics drawing apparatus in accordance with the sixth embodiment of the present invention is similar in schematic configuration to the three-dimensional graphics drawing apparatus in accordance with the fifth embodiment shown in FIG. 6, and differs only in that the object of operation by the offset operating circuit is the color data (R, G, B). Therefore, detailed description of the configuration and functions will not be repeated. In the present embodiment, the offset register and the offset operating circuit will be denoted by the reference characters 3a and 4a.

FIGS. 3A and 3B represent processing of the primitive by the three-dimensional graphics drawing apparatus in accordance with the present embodiment. FIG. 3A represents a polygon 13 constituting a primitive before processing, which is drawn by three vertex color data 14 to 16. For example, when offset operating circuit 4a adds an offset value stored in offset register 3a to color data 14 to 16 of the vertexes of polygon 13, the color data 14 to 16 of respective vertexes are changed to new color data 14A to 16A as shown in FIG. 3B. As a result, it becomes possible for drawing unit 5 to paint the polygon 13A in different gradation.

In this manner, by successively updating the offset value stored in offset register 3a, it becomes possible to make the overall color of the primitive darker or lighter, and the drawing effect of white-out or black-out can easily be attained. Further, by adding an offset value only to any of R, G and B, it becomes possible to draw the same primitive in a color completely different from the original color.

As described above, according to the three-dimensional graphics drawing apparatus in accordance with the present embodiment, an offset value is added to vertex color data of a polygon constituting a primitive calculated by geometrical operation unit 2 and the result is output to drawing unit 5 so that the change in color of the primitive is represented. Therefore, different from the conventional three-dimensional graphics drawing apparatus, it is unnecessary to repeat geometrical operations on a moving primitive, so that high speed drawing becomes possible, and hence, the speed of processing of the overall three-dimensional graphics drawing apparatus can be improved.

Seventh Embodiment

The three-dimensional graphics drawing apparatus in accordance with the seventh embodiment of the present invention is similar in schematic configuration to the three-dimensional graphics drawing apparatus in accordance with the fifth embodiment shown in FIG. 6, and differs only in that the object of operation by the offset operating circuit is the transmissivity data (A). Therefore, detailed description of the configuration and functions will not be repeated. In the present embodiment, the offset register and the offset operating circuit will be denoted by the reference characters 3b and 4b.

FIGS. 4A and 4B represent processing of the primitive by the three-dimensional graphics drawing apparatus in accordance with the present embodiment. FIG. 4A represents a polygon 17 constituting a primitive before processing, which is drawn by three vertex transmissivity data 18 to 20. A different primitive 21 is drawn behind polygon 17. For example, when offset operating circuit 4b adds an offset value stored in offset register 3b to transmissivity data 18 to 20 of the vertexes of polygon 17, the transmissivity data 18 to 20 of respective vertexes are changed to new transmissivity data 18A to 20A as shown in FIG. 4B. As a result, it becomes possible for drawing unit 5 to draw polygon 17A with different transmissivity, so that primitive 21 on the background can be seen through.

By successively updating the offset value stored in offset register 3b in this manner, the transmissivity of the primitive can be changed, and it becomes possible to change the transmissivity of a non-transparent primitive so that a primitive on a background can be seen through.

As described above, according to the three-dimensional graphics drawing apparatus in accordance with the present embodiment, by adding an offset value to transmissivity data of vertexes of a polygon constituting a primitive calculated by geometrical operation unit 2 and outputting the result to drawing unit 5, the change in transmissivity is represented. Therefore, different from the conventional three-dimensional graphics drawing apparatus, it becomes unnecessary to repeat geometrical operations on the primitive, high speed drawing becomes possible, and hence the speed of processing of the overall three-dimensional graphics drawing apparatus can be improved.

Eighth Embodiment

The three-dimensional graphics drawing apparatus in accordance with the eighth embodiment of the present invention is similar in schematic configuration to the three-dimensional graphics drawing apparatus in accordance with the fifth embodiment shown in FIG. 6, and differs only in that the object of operation by the offset operating circuit is the texture mapping coordinate data (U,V). Therefore, detailed description of the configuration and functions will not be repeated. In the present embodiment, the offset register and the offset operating circuit will be denoted by the reference characters 3c and 4c.

FIGS. 5A to 5C represent processing of the primitive by the three-dimensional graphics drawing apparatus in accordance with the present embodiment. FIG. 5A represents a polygon 22 constituting a primitive before processing, which is drawn by three texture mapping coordinate data 23 to 25. For example, when an offset value is added to the U value representing the X direction of the texture mapping coordinate data 23 to 25 of the polygon 22 shown in FIG. 5A, respective texture mapping coordinates 23 to 25 move to new texture mapping coordinates 23A to 25A, and the texture of polygon 22 is translated in the X direction and drawn as a texture of a polygon 22A, as shown in FIG. 5B.

When the offset value is added to V value representing the Y direction, among the texture mapping coordinate data of polygon 22 shown in FIG. 5A, respective texture mapping coordinates 23 to 25 move to new texture mapping coordinates 23B to 25B, and the texture of polygon 22 is translated in the Y direction and drawn as a texture of a polygon 22B, as shown in FIG. 5C.

By successively updating the offset value stored in offset register 3c in this manner, it is possible to shift the texture mapping coordinate data only for the texture of such a primitive that is in motion, so as to represent the motion of the texture.

As described above, according to the three-dimensional graphics drawing apparatus in accordance with the present embodiment, an offset value is added to vertex coordinates of a polygon constituting a primitive calculated by geometrical operation unit 2 and the result is output to drawing unit 5 so that the motion of the primitive is represented with close resemblance. Therefore, different from the conventional three-dimensional graphics drawing apparatus, it is unnecessary to repeat geometrical operations on a moving primitive, so that high speed drawing becomes possible, and hence, the speed of processing of the overall three-dimensional graphics drawing apparatus can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three-dimensional graphics drawing apparatus, comprising:
   a geometrical operation unit generating vertex data of a polygon;
   an offset register storing an offset value corresponding to the vertex data of the polygon generated by said geometrical operation unit;
   an offset operating circuit performing an arithmetic operation on the vertex data of the polygon output from said geometrical operation unit using the offset value stored in said offset register; and a drawing unit drawing said polygon based on the vertex data after the arithmetic operation by said offset operating circuit.

2. The three-dimensional graphics drawing apparatus according to claim 1, wherein said vertex data includes vertex coordinate data.

3. The three-dimensional graphics drawing apparatus according to claim 1, wherein said vertex data includes color data.

4. The three-dimensional graphics drawing apparatus according to claim 1, wherein said vertex data includes transmissitivity data.

5. The three-dimensional graphics drawing apparatus according to claim 1, wherein said vertex data includes texture mapping coordinate data.

6. A three-dimensional graphics drawing apparatus, comprising:

a reading unit reading vertex data of a polygon which has been subjected to geometrical operation in advance;

an offset register storing an offset value for the vertex data of the polygon read by said reading unit;

an offset operating circuit performing an arithmetic operation on the vertex data of the polygon read by said reading unit using the offset value stored in said offset register; and a drawing unit drawing said polygon based on the vertex data after the arithmetic operation by said offset operating circuit.

7. The three-dimensional graphics drawing apparatus according to claim 6, wherein said vertex data includes vertex coordinate data.

8. The three-dimensional graphics drawing apparatus according to claim 6, wherein said vertex data includes color data.

9. The three-dimensional graphics drawing apparatus according to claim 6, wherein said vertex data includes transmissitivity data.

10. The three-dimensional graphics drawing apparatus according to claim 6, wherein said vertex data includes texture mapping coordinate data.

11. A method of drawing three-dimensional graphics, comprising the steps of:

reading vertex data of a polygon which has been subjected to geometrical operation in advance;

performing an arithmetic operation on said read vertex data of the polygon using an offset value; and drawing said polygon based on the vertex data after the arithmetic operation with said offset value.

12. The method of drawing three-dimensional graphics according to claim 11, wherein said vertex data includes vertex coordinate data.

13. The method of drawing three-dimensional graphics according to claim 11, wherein said vertex data includes color data.

14. The method of drawing three-dimensional graphics according to claim 11, wherein said vertex data includes transmissitivity data.

15. The method of drawing three-dimensional graphics according to claim 11, wherein said vertex data includes texture mapping coordinate data.

* * * * *